(12) United States Patent
Glover (10) Patent No.: US 11,567,907 B2
(45) Date of Patent: Jan. 31, 2023

(54) METHOD AND SYSTEM FOR COMPARING DOCUMENT VERSIONS ENCODED IN A HIERARCHICAL REPRESENTATION

(71) Applicant: Workshare, Ltd., London (GB)

(72) Inventor: Robin Glover, London (GB)

(73) Assignee: WORKSHARE, LTD., London (GB)

( * ) Notice: Subject to any disclaimer, the term of this patent is extended or adjusted under 35 U.S.C. 154(b) by 79 days.

(21) Appl. No.: 13/830,332

(22) Filed: Mar. 14, 2013

(65) Prior Publication Data
US 2014/0280336 A1  Sep. 18, 2014

(51) Int. Cl.
G06F 16/18 (2019.01)
G06F 16/93 (2019.01)

(52) U.S. Cl.
CPC .......... *G06F 16/1873* (2019.01); *G06F 16/93* (2019.01)

(58) Field of Classification Search
CPC .............................. G06F 16/1873; G06F 16/93
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,699,427 A | 12/1997 | Chow et al. |
| RE35,861 E | 7/1998 | Queen |
| 5,787,175 A | 7/1998 | Carter |
| 5,787,444 A | 7/1998 | Gerken et al. |
| 5,801,702 A | 9/1998 | Dolan et al. |
| 5,806,078 A | 9/1998 | Hug et al. |
| 5,819,300 A | 10/1998 | Kohno et al. |

(Continued)

FOREIGN PATENT DOCUMENTS

| | | |
|---|---|---|
| KR | 10-2004-0047413 | 5/2004 |
| KR | 10-2007-0049518 | 11/2007 |

OTHER PUBLICATIONS

Cawood, Stephen. How to Do Everything™ Microsoft® SharePoint® 2010. McGraw-Hill, 2010. ISBN 978-0-07-174367-9 (pbk). Copyright © 2010.

(Continued)

*Primary Examiner* — Albert M Phillips, III
(74) *Attorney, Agent, or Firm* — Nixon Peabody LLP (57) ABSTRACT

This invention discloses a novel system and method for comparing electronic documents that are created on different software platforms or that are in different data formats by traversing the two hierarchical representations of the documents in a manner so as to selectively ignore nodes in the hierarchy and attempt to resynchronize the sequence of traversing when nodes have no matching content.

21 Claims, 7 Drawing Sheets

(56) References Cited

U.S. PATENT DOCUMENTS

| | | |
|---|---|---|
| 5,832,494 A | 11/1998 | Egger et al. |
| 5,890,177 A | 3/1999 | Moody et al. |
| 5,897,636 A | 4/1999 | Kaeser |
| 5,898,836 A | 4/1999 | Frievald et al. |
| 6,003,060 A | 12/1999 | Aznar et al. |
| 6,012,087 A | 1/2000 | Frievald et al. |
| 6,029,175 A | 2/2000 | Chow et al. |
| 6,038,561 A | 3/2000 | Snyder et al. |
| 6,049,804 A | 4/2000 | Burgess et al. |
| 6,067,551 A | 5/2000 | Brown et al. |
| 6,088,702 A | 7/2000 | Plantz et al. |
| 6,128,635 A | 10/2000 | Ikeno |
| 6,145,084 A | 11/2000 | Zuili et al. |
| 6,189,019 B1 | 2/2001 | Blumer et al. |
| 6,212,534 B1 | 4/2001 | Lo et al. |
| 6,212,543 B1 | 4/2001 | Lo et al. |
| 6,219,818 B1 | 4/2001 | Frievald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,317,777 B1 | 11/2001 | Skarbo et al. |
| 6,321,265 B1 | 11/2001 | Najork et al. |
| 6,327,611 B1 | 12/2001 | Everingham |
| 6,336,123 B2 | 1/2002 | Inoue et al. |
| 6,351,755 B1 | 2/2002 | Najork et al. |
| 6,356,937 B1 | 3/2002 | Montville et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,745,024 B1 | 6/2004 | DeJaco et al. |
| 6,832,202 B1 | 12/2004 | Schuyler et al. |
| 6,918,082 B1 | 7/2005 | Gross |
| 7,085,735 B1 | 8/2006 | Hall et al. |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,181,492 B2 | 2/2007 | Wen et al. |
| 7,194,761 B1 | 3/2007 | Champagne |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,356,704 B2 | 4/2008 | Rinkevich et al. |
| 7,434,164 B2 | 10/2008 | Salesin et al. |
| 7,496,841 B2 | 2/2009 | Hadfield |
| 7,564,997 B2 | 7/2009 | Hamid |
| 7,624,447 B1 | 11/2009 | Horowitz et al. |
| 7,627,613 B1 | 12/2009 | Dulitz et al. |
| 7,673,324 B2 | 3/2010 | Tirosh et al. |
| 7,680,785 B2 | 3/2010 | Najork |
| 7,685,298 B2 | 3/2010 | Day |
| 7,694,336 B2 | 4/2010 | Rinkevich et al. |
| 7,707,153 B1 | 4/2010 | Petito et al. |
| 7,788,235 B1 | 8/2010 | Yeo |
| 7,796,309 B2 | 9/2010 | Sadovsky et al. |
| 7,797,724 B2 | 9/2010 | Calvin |
| 7,818,678 B2 | 10/2010 | Massand |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,958,101 B1 | 6/2011 | Teugels et al. |
| 8,005,277 B2 | 8/2011 | Tulyakov et al. |
| 8,042,112 B1 | 10/2011 | Zhu et al. |
| 8,117,225 B1 | 2/2012 | Zilka |
| 8,145,724 B1 | 3/2012 | Hawks et al. |
| 8,181,036 B1 | 5/2012 | Nachenberg |
| 8,196,030 B1 | 6/2012 | Wang et al. |
| 8,233,723 B2 | 7/2012 | Sundaresan |
| 8,286,085 B1 | 10/2012 | Denise |
| 8,301,994 B1* | 10/2012 | Shah et al. .................. 715/229 |
| 8,316,237 B1 | 11/2012 | Felsher et al. |
| 8,473,847 B2 | 6/2013 | Glover |
| 8,572,388 B2 | 10/2013 | Boemker et al. |
| 8,620,872 B1 | 12/2013 | Killalea |
| 8,635,295 B2 | 1/2014 | Mulder |
| 8,732,127 B1 | 5/2014 | Rotterdam et al. |
| 8,776,190 B1 | 7/2014 | Cavage et al. |
| 8,797,603 B1 | 8/2014 | Dougherty et al. |
| 8,839,100 B1 | 9/2014 | Donald |
| 9,092,636 B2 | 7/2015 | More et al. |
| 9,098,500 B1 | 8/2015 | Asokan et al. |
| 9,311,624 B2 | 4/2016 | Diament et al. |
| 9,652,485 B1 | 5/2017 | Bhargava et al. |
| 2001/0018739 A1 | 8/2001 | Anderson et al. |
| 2001/0042073 A1 | 11/2001 | Saether et al. |
| 2002/0010682 A1 | 1/2002 | Johnson |
| 2002/0016959 A1 | 2/2002 | Barton et al. |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | W. Robohm |
| 2002/0138744 A1 | 9/2002 | Schleicher et al. |
| 2002/0159239 A1 | 10/2002 | Amie et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0051054 A1 | 3/2003 | Redlich et al. |
| 2003/0061260 A1 | 3/2003 | Rajkumar |
| 2003/0061350 A1 | 3/2003 | Masuoka et al. |
| 2003/0078880 A1 | 4/2003 | Alley et al. |
| 2003/0084279 A1 | 5/2003 | Campagna |
| 2003/0093755 A1* | 5/2003 | O'Carroll .................. 715/500 |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0233419 A1 | 12/2003 | Beringer |
| 2003/0237047 A1 | 12/2003 | Borson |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138350 A1 | 6/2005 | Hariharan |
| 2005/0138540 A1 | 6/2005 | Baltus et al. |
| 2005/0204008 A1 | 9/2005 | Shinbrood |
| 2005/0251738 A1 | 11/2005 | Hirano et al. |

(56) References Cited

U.S. PATENT DOCUMENTS

| | | |
|---|---|---|
| 2005/0256893 A1 | 11/2005 | Perry |
| 2005/0268327 A1 | 12/2005 | Starikov |
| 2005/0278421 A1 | 12/2005 | Simpson et al. |
| 2006/0005247 A1 | 1/2006 | Zhang et al. |
| 2006/0021031 A1 | 1/2006 | Leahy et al. |
| 2006/0047765 A1 | 3/2006 | Mizoi et al. |
| 2006/0059196 A1 | 3/2006 | Sato et al. |
| 2006/0064717 A1 | 3/2006 | Shibata et al. |
| 2006/0069740 A1 | 3/2006 | Ando |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2007/0005589 A1 | 1/2007 | Gollapudi |
| 2007/0011211 A1 | 1/2007 | Reeves et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0112930 A1 | 5/2007 | Foo et al. |
| 2007/0150443 A1* | 6/2007 | Bergholz .......... G06F 17/30569 |
| 2007/0179967 A1 | 8/2007 | Zhang |
| 2007/0220061 A1 | 9/2007 | Tirosh et al. |
| 2007/0220068 A1 | 9/2007 | Thompson et al. |
| 2007/0261099 A1 | 11/2007 | Broussard et al. |
| 2007/0261112 A1 | 11/2007 | Todd et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0091465 A1 | 4/2008 | Fuschino et al. |
| 2008/0091735 A1 | 4/2008 | Fukushima et al. |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1 | 9/2008 | Rothbarth et al. |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1* | 4/2010 | Ramakrishnan et al. .... 717/121 |
| 2010/0131604 A1 | 5/2010 | Portilla |
| 2010/0146382 A1* | 6/2010 | Abe et al. ............... 715/234 |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1* | 10/2011 | Rahaman ............ G06F 17/2211 |
| | | 715/255 |
| 2011/0264907 A1 | 10/2011 | Betz et al. |
| 2011/0314384 A1 | 12/2011 | Lindgren et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0117096 A1 | 5/2012 | Massand |
| 2012/0117644 A1 | 5/2012 | Soeder |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0185511 A1* | 7/2012 | Mansfield ............. G06F 17/218 |
| | | 707/792 |
| 2012/0246115 A1 | 9/2012 | King et al. |
| 2012/0260188 A1 | 10/2012 | Park et al. |
| 2012/0317239 A1 | 12/2012 | Mulder |
| 2013/0007070 A1* | 1/2013 | Pitschke ............... 707/803 |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1* | 8/2013 | Tvorun et al. ............. 715/235 |
| 2014/0032489 A1 | 1/2014 | Hebbar et al. |
| 2014/0115436 A1 | 4/2014 | Beaver et al. |
| 2014/0136497 A1* | 5/2014 | Georgiev et al. ........... 707/695 |
| 2014/0181223 A1 | 6/2014 | Homsany et al. |
| 2014/0279843 A1 | 9/2014 | Von Weihe |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

OTHER PUBLICATIONS

Microsoft SharePoint 2010 SDK: Building Block: Files and Documents, msn.microsoft.com (Nov. 1, 2010), https://msdn.microsoft.com/en-us/library/office/ee538269(v=office.14).aspx, (last visited Feb. 27, 2017).

Microsoft SharePoint 2010 SDK: How to: Upload a File to a SharePoint Site from a Local Folders, msn.microsoft.com (Jul. 7,

(56) References Cited

OTHER PUBLICATIONS

2010), https://msdn.microsoft.com/en-us/library/office/ms454491(v=office.14).aspx, (last visited Feb. 27, 2017).

Microsoft SharePoint 2010 White Paper, Microsoft.com, www.microsoft.com/downloads/en/details.aspx?familyid=5c562f71-3aa9-46fd-abac-7d381813f2b8 (Sep. 2010), www.microsoft.com/downloads/en/details.aspx?FamilyID=5c562f71-3aa9-46fd-abac-7d381813f2b8 (last visited Feb. 27, 2017).

Office Web Apps Overview (Installed on SharePoint 2010 Products), Technet.Microsoft.com (Jun. 11, 2010), https://technet.microsoft.com/en-us/library/ff431685(v=office.14).aspx, (last visited Feb. 27, 2017).

User Permissions and Permission Levels (SharePoint Foundation 2010)(technet.microsoft.com) (Jan. 4, 2011), http://technet.microsoft.com/en-us/library/cc288074(v=office.14).aspx (last visited Feb. 27, 2017).

Jamison, Scott. Essential SharePoint 2010: Overview, Governance, and Planning. Addison-Wesley Professional; 1 edition (Aug. 22, 2010).

Lightfoot, Johnathan and Beckett, Chris. Plain & Simple Microsoft® SharePoint® 2010. O'Reilly Media, Inc. Copyright © 2010.

Lender, Olga and Coventry, Penelope. Step by Step Microsoft® SharePoint® Foundation 2010. Microsoft Press. ISBN: 978-0-7356-2726-0. Copyright © 2011.

Pattison, Ted et al. Inside Microsoft® SharePoint® 2010. Critical Path Training, LLC © 2011.

Sahil Malik. Microsoft SharePoint 2010: Building Solutions for SharePoint 2010. Apress; 1st ed. edition (Jun. 7, 2010).

Bettenburg et al., An Empirical Study on the Risks of Using Off-the-Shelf Techniques for Processing Mailing List Data, 2009, IEEE 4 pages.

Bindu et al., Spam War: Battling Ham against Spam, 2011 IEEE 6 pages.

Bobba et al. Attribute-Based Messaging: Access Control and Confidentiality, 2010, ACM 35 pages.

Chen et al., Online Detection and Prevention of Phishing Attacks, 2006, IEEE 7 pages.

Karnouskos et al., Active Electronic Mail, 2002, ACM 6 pages.

Kaushik et al., Email Feedback: A Policy based Approach to Overcoming False Positives, 2005, 10 pages.

Stolfo et al., AMT?MET: Systems for Modeling and Detecting Errant Email. 2003, IEEE 6 pages.

Jain, Pravin. The class of JAVA. Aug. 12, 2010.

Workshare Ltd. Workshare Protect 4.5 Admin Guide, (c) 2006.

Classification Definitions Class 715, Data Processing: Presentation Processing of Document, Operator Interface Processing, and Screen Saver Display Processing; Feb. 2011; pp. 1-33.

Non-Final Office Action dated May 17, 2013 in co-pending U.S. Appl. No. 13/306,765 by Mulder, S.P.M., filed Nov. 29, 2011.

Non-Final Office Action dated Aug. 13, 2013 in co-pending U.S. Appl. No. 13/306,819 by Glover, R.W., filed Nov. 29, 2011.

Tsai, et al., "A document Workspace for Collaboration and Annotation based on XML Technology", Department of Electrical Engineering, 2001, pp. 165-172.

Roussev, et al., "Integrating XML and Object-based Programming for Distributed Collaboration", IEEE, 2000, pp. 254-259.

XP-002257904, "Workshare Debuts Synergy", 2003, 3 pages.

PC Magazine "Pure Intranets: Real-Time Internet Collaboration", Aug. 30, 2001.

Non-Final Office Action dated May 7, 2008 in Co-pending U.S. Appl. No. 10/023,010, filed Dec. 17, 2001.

Final Office Action dated Apr. 17, 2007 for U.S. Appl. No. 10/023,010, filed Dec. 17, 2001, Issued U.S. Pat. No. 7,496,841.

International Search Report of PCT Application No. PCT/US2010/043345, dated Apr. 28, 2011, 3 pages.

Non-Final Office Action dated Mar. 16, 2006 for U.S. Appl. No. 10/023,010, filed Dec. 17, 2001, Issued U.S. Pat. No. 7,496,841.

Restriction Requirement dated Feb. 14, 2005 for U.S. Appl. No. 10/023,010, filed Dec. 17, 2001, Issued U.S. Pat. No. 7,496,841.

Restriction Requirement dated Jun. 30, 2006 for U.S. Appl. No. 10/136,733, filed Apr. 30, 2002.

Wells et al., "Groupware & Collaboration Support", www.objs.com/survey/groupwar.htm, Aug. 30, 2001, 10 pages.

Microsoft, "Microsoft XP, Product Guide", pp. 1-26, 2005.

International Search Report of PCT Application No. PCT/IB2002/005821, dated Jan. 3, 2004, 6 pages.

Non-Final Office Action dated Mar. 20, 2006 in Co-pending U.S. Appl. No. 10/136,733, filed Apr. 30, 2002.

Notice of Allowance dated Oct. 24, 2008 in Co-pending U.S. Appl. No. 10/023,010, filed Dec. 17, 2001.

* cited by examiner

METHOD AND SYSTEM FOR COMPARING DOCUMENT VERSIONS ENCODED IN A HIERARCHICAL REPRESENTATION

FIELD OF INVENTION

The present invention generally relates to the field of digital document review. More particularly, the present invention relates to methods and systems for detecting changes and/or differences between an original document and a modified version of the document.

BACKGROUND

Many real world data sets are hierarchical, i.e. they can be represented in a tree-like structure where every node in the tree may have an ordered collection of sub-nodes. Examples might include an organizational hierarchy, the structure of a document (consisting of sections, paragraphs, tables, rows, cells, etc.) or the categorization of items in a taxonomy. The purpose of this invention is to calculate a correspondence between two sets of hierarchical data where the underlying data represented by the hierarchies is the similar, but the node structures used to represent that data differ. The invention works for hierarchies that are ordered and where the ordering is the same between the two representations of the data and the dissimilarities between the two representations are small. The tree hierarchy must be such that a depth first traversal of the tree visits the tree nodes in the correct order. The particular problem that this technique was invented to solve was to deal with the case where two tree representations of the same word-processing document have been obtained by reading the document through different document display or editing programs. For example, one representation may have been obtained by loading the document into Microsoft Word and examining the Document Object Model exposed to VBA and COM by the Word application, while the other may have been obtained by using a code library to read the content of the document directly. In this case, while the text of the document in the two representations would be expected to be largely the same (excepting possibly different handling of special characters etc.), the hierarchies may differ. Therefore, there is a need for a system and method that can compare the two documents by means of the hierarchy. These and other objects, features and characteristics of the present invention will become more apparent to those skilled in the art from a study of the following detailed description in conjunction with the appended claims and drawings, all of which form a part of this specification. It should be understood that the description and specific examples are intended for purposes of illustration only and not intended to limit the scope of the present disclosure.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
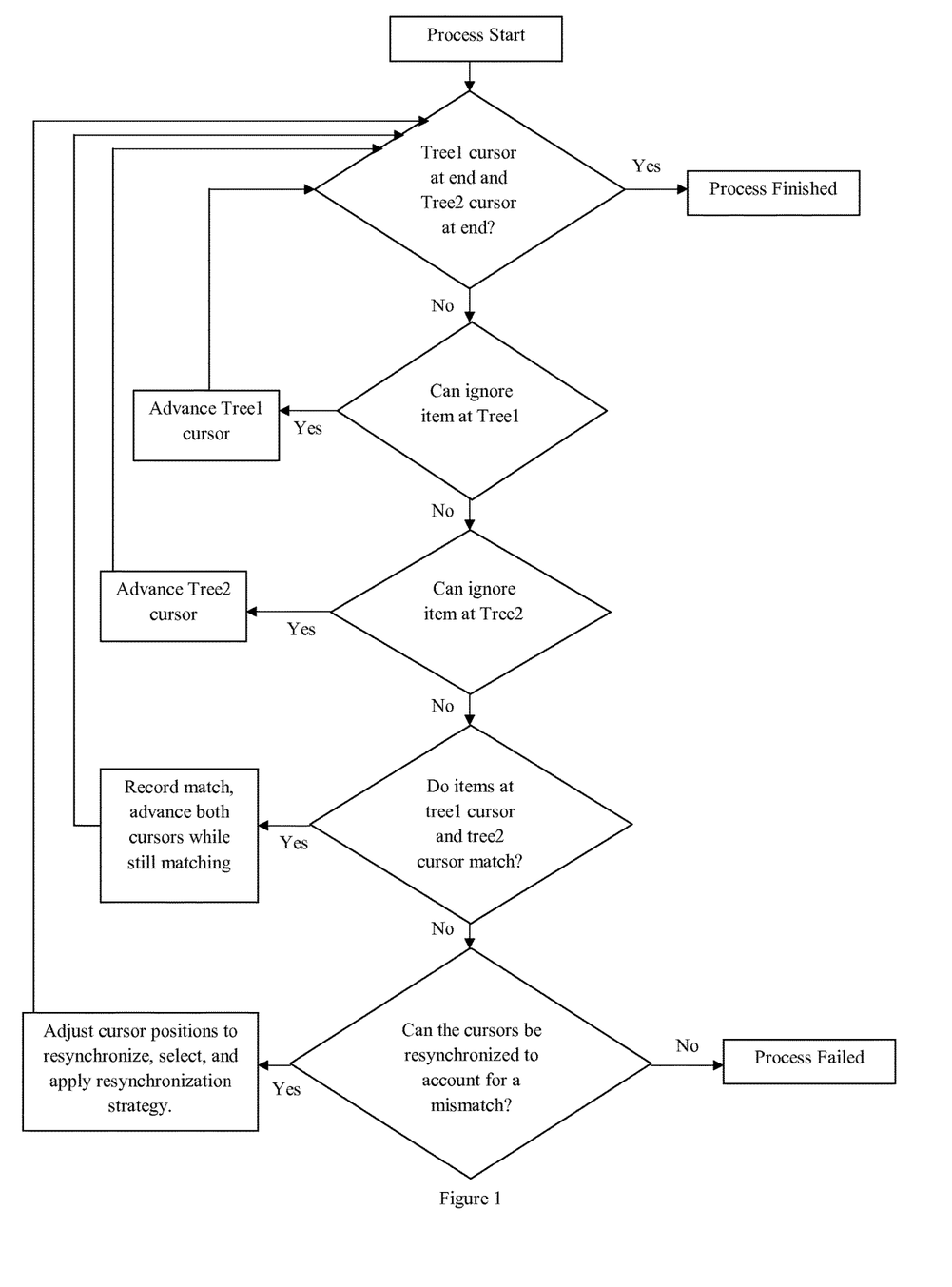
FIG. 1 shows a flowchart depicting the basic architecture of the process.
Figure 4:
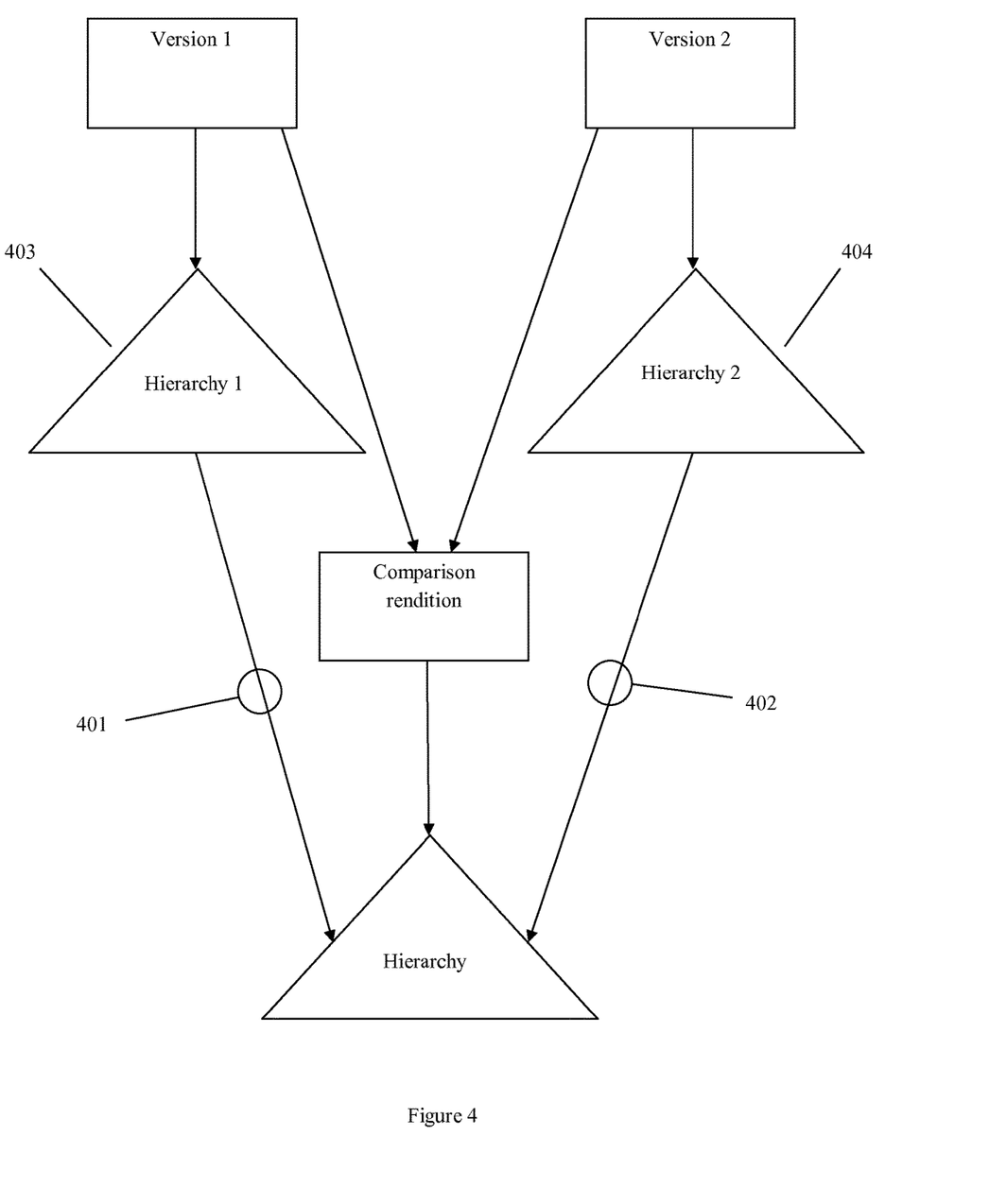
FIG. 4 shows a schematic of system components.

The solution works by maintaining a pair of cursors, one recording the position that the algorithm has reached in the first representation of the data and the other recording the position that the algorithm has reached in the second representation of the data. These cursors begin at the root node of each representation and are advanced by traversing the tree in depth first order. See FIG. 1. By cursor, it is also meant to include a pointer or other data object that an algorithm can use as the reference to a node in a tree data structure. The details of how each decision is made is dependent on the type of data represented by the two trees and how the tree structures differ. Where the types of data differ, then one cursor advances to the next node in the search while the other cursor remains at the same position. For instance in the case of two representations of a document, tree 1 (403) may contain nodes that represent the position of bookmarks in the document, while tree 2 (404) may not contain bookmark information. In this case, the decision 'can ignore item at tree1 cursor' would be yes if the tree 1 cursor is pointing to a bookmark node. The tree 1 cursor would then be advanced past the bookmark node (without moving the tree 2 cursor) to allow the matching process to proceed.

Figure 5:
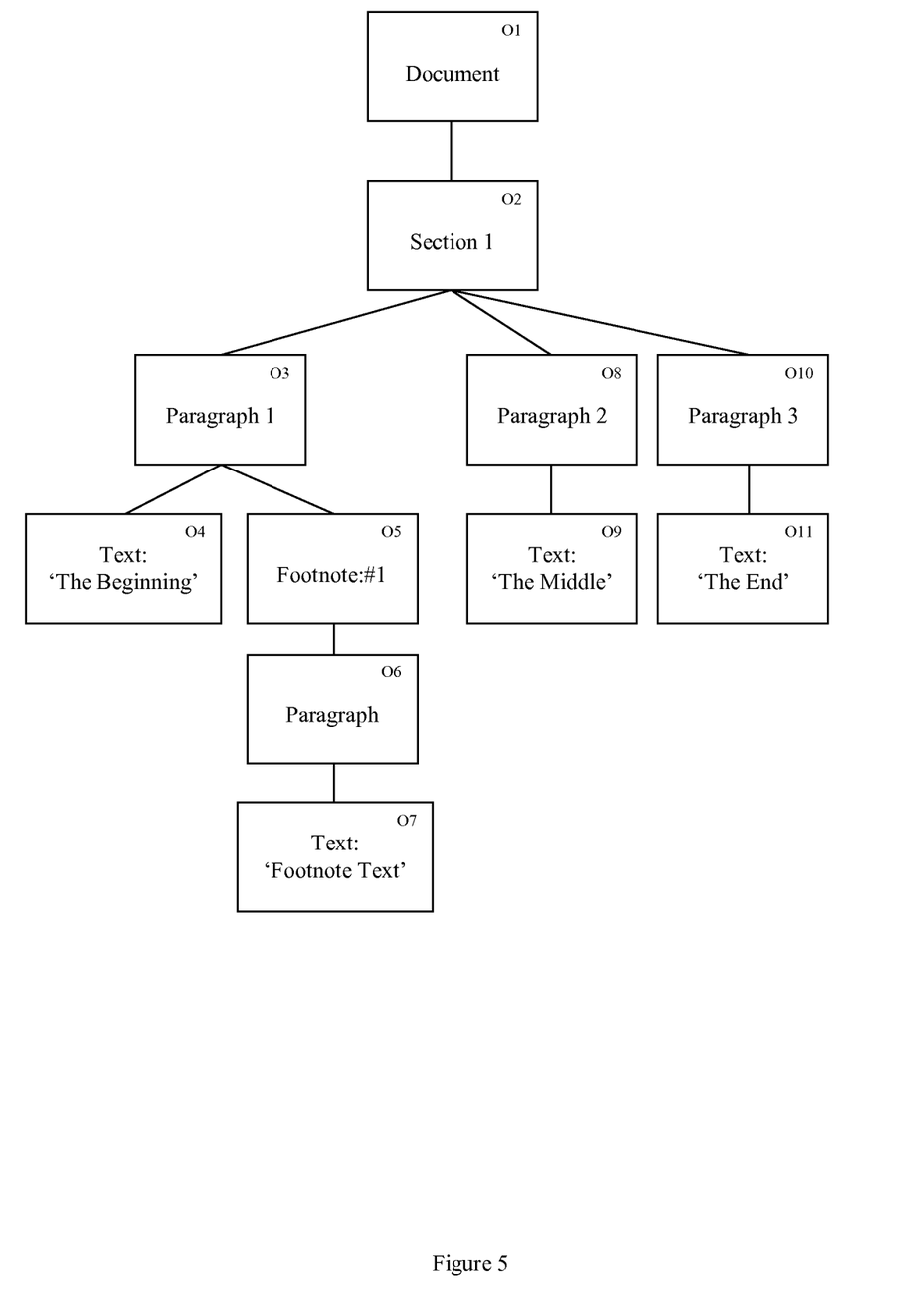
FIG. 5 shows an example hierarchy of first document version.

In the case of the decisions as to whether the items at the cursors match, the logic is domain dependent. To give another document related example, in tree 1 a paragraph may be represented as a paragraph node with the text of the paragraph contained in its child node(s). See FIG. 5. In tree 2, the end of paragraphs may be represented by 'paragram marker' nodes which have no children and are sibling nodes to the nodes containing text. In this case the end of a paragraph node from tree 1 is taken to be a match for a paragraph marker node from tree 2, while the start of a paragraph node from tree 1 may be ignored.

In the case where the two nodes do not match at all, the process re-synchronizes. The re-synchronization stage exists to deal with minor mismatches between the content of the two documents that cannot be handled by simply ignoring items from one tree or another or allowing more flexible matching between the two trees. It can deal with situations such like 'sometimes we get an extra paragraph break from tree 2 which isn't in tree 1'. This situation cannot be dealt with by ignoring paragraph breaks from tree 2 (which would ignore all of them), or by allowing them to match to nothing in the matching stage, so it must be dealt with by the resynchronization stage.

Resynchronization is only attempted after normal ignoring and matching has failed. This ensures that items that can be matched will be in preference to them being skipped over by a resynchronization. That the ordering of the resynchronization stage after the ignoring and matching stages cannot move the cursors forward at a particular location is important. In practice, the resynchronization step consists of trying, in turn, each strategy in a list of resynchronization strategies that have been designed to deal with the differences between the two representations of the data. Each strategy is tested to see if it can deal with the current situation. If it can, the strategy takes steps to resynchronize the cursors, which may involve advancing one or both cursors and possibly recording a match. As soon as a strategy succeeds in advancing either cursor, the processing of the list of resynchronization strategies stops and the main algorithm returns to testing for ignores and matches. This ensures that possible matches are not missed due to unnecessary resynchronizations.

In general, resynchronization strategies will be attempted in order from the most simple and restrictive first to more complex and more generally applicable towards the end of the list. Some resynchronization strategies may just examine the nodes pointed to by the current cursor positions, others may 'look ahead' at nodes further on in the traversal of the tree or up the tree to the parent nodes of the current nodes to determine if they are applicable—for instance a strategy might only be applicable if the current location is within a table cell.

It is possible to use the list of resynchronization strategies to add resilience to the method and system, so that it can generally continue even when encountering mismatches between the two trees that had not been envisaged at design time. In the case of document matching, this can be achieved by adding a resynchronization strategy to the end of the list of strategies that traverses forward in each view of the document collecting text that is still to be encountered. The strategy may collect a fixed amount of text from each document (perhaps a maximum of 100 characters) or collect all text to the end of the document. By considering discarding a small number of characters from the start of either or both streams of collected text, the strategy may be able to locate an alignment between the two streams of text where they begin to match again. The strategy can then advance each cursor appropriately to place them at the position in the tree where the next significant text match occurs, stepping over the unexpected area of mismatch between the two documents and allowing the matching process to continue.

Figure 2:
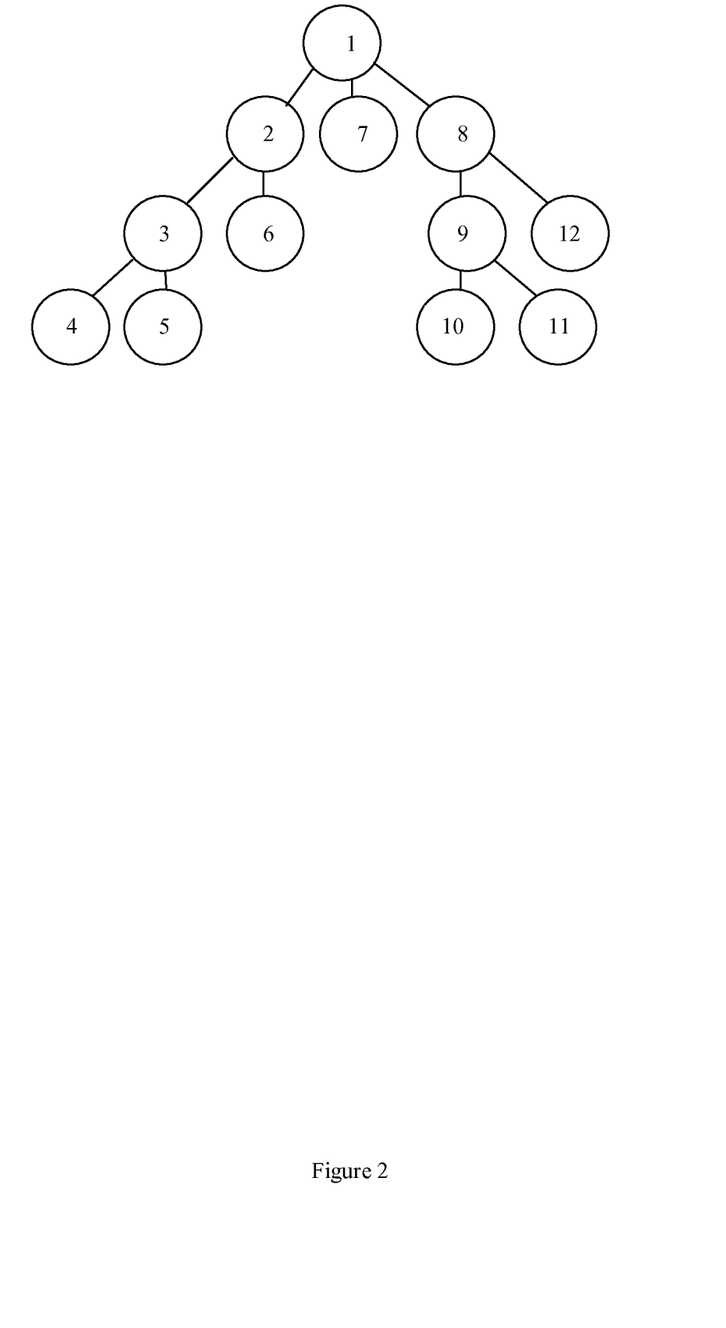
FIG. 2 shows an example tree hierarchy.

In a standard depth first traversal of a tree, nodes are visited in order:
Starting node
First child of starting node
All children of first child (treating it by the same rules as the starting node0
Second child node of starting node
All children of second child (same rules)
Third child node and children
Continue until all child nodes visited.

For the purposes of this algorithm, the best results can be obtained by modifying the traversal so that nodes with child nodes are visited twice, once 'at start' before their child nodes are traversed and again 'at end' after their child nodes have been traversed.

Thus the traversal order for the tree shown above would be:
1 (at start)
2 (at start)
3 (at start)
4
5
3 (at end)
6
2 (at end)
7
8 (at start)
. . .

This modification allows matching to occur between items that could not otherwise be matched—for instance the end of a paragraph node containing text child nodes and a 'paragraph marker' node in the other tree.

Process Output

The output of the process is the collection of all matches registered between pairs of nodes in the two hierarchies. This list of matches can be used to locate data or elements in one hierarchy in the context of the other hierarchy. This information may then be used to carry out various further processing steps based on the nature of the overall problem being solved.

Optimizations

In the case where the number of nodes rises to such an extent that performance and memory use suffer (such as might be the case when assigning a node to every character in a large document), the process can be altered so that the cursors track a position within certain types of node that have no child nodes. This would allow a number of character nodes (in the example given) to be replaced by a single text node with multiple characters. When within a text node the cursors would track the node being targeted and the offset within the node of the current position. Matching, ignoring or resynchronizing operations would be then able to move the current position forward a certain number of characters when operating at a position within a text node.

When two nodes do not match, the system can use resynchronization strategies to recover and continue the matching process. The resynchronization strategies are rules that can be applied to adjust the process in a deterministic way. Examples include:

For cases where a list number is automated numbering relying paragraph formatting characters in one hierarchy and rendered number text in the other, the strategy is to determine the numbering in the first hierarchy I norder that the list number text calculated from the paragraph formatting can be matched to the actual text content in the other hierarchy For complex fields when reading document content from OOXML or DOCX. In cases where a document field consists of an instruction (a formula, macro, program statement or other code that instructs an application in what is to be calculated) and a result (which is what was calculated the last time the word-processor or application updated it), the strategy is: In the redline this structure is replicated, so that a field node has child nodes of 'instruction' and 'result'. In the OOXML or DOCX format, some fields are represented differently—like this:
Parent Node
Field start instruction node
(multiple nodes forming content of instruction)
Field start result node
(multiple nodes forming content of result)
Field end node The resynchronization spots the pattern that one hierarchy is at the start of a field and the other is at a 'field start instruction node' and moves the cursors to the end of the field and after the 'field end node' respectively.

Field against special characters resync-in .doc files, certain simple fields are represented as a single special character of text (largely different versions of the date/time and the page number). In the docx documents and the comparison output these are represented as standard fields. The resynchronization strategy is toallow the special characters to be matched to the appropriate field object.

A more generic resynchronization can be applied (as the resync of last resort) which looks at the next N characters in each hierarchy (in one embodiment N being approximately 200), ignoring document structure. The resync tests the match between these two streams of characters with varying offsets to find the best match (i.e. the offset where the most characters match), then adjusts the cursors to the point where the next text match occurs at that offset. This will step over arbitrary blocks of mismatched text or structure attempting to find a point where the hierarchies match again, allowing the matching process to continue.

Tracking Locations from One Version to Another Version.

Tracking the location of elements within a document as the document is edited is a trivial exercise when doing it from within the code of the editing application. The editing application can continuously update the location as text is added to, removed from or re-arranged within the document. Outside the editing application however, there is considerable difficulty in performing such tracking of content and position between different versions of a document. Various options exist which involve automated modifications to the document itself—such as inserting multiple bookmarks in the document. Such bookmarks can however be an annoyance to the user if they are also using bookmarks in the document, and can lead to performance issues when editing if the document is and the number of bookmarks inserted becomes very large. Techniques relying on bookmark insertion (or other entities within the document equivalent to bookmarks) can also be defeated by the natural editing process of the document leading to the bookmarks being removed either deliberately or accidentally.

Additionally, techniques requiring items to be tracked either via the editing application or via bookmarks or similar techniques requires the tracking to be set up in advance—content cannot be tracked back into versions of the document before the bookmarks were inserted, for instance. The problem to be solved therefore is to be able to track content and position between document versions in a purely passive (no modifications to the document required to enable tracking) manner, based only on the archived content of the previous and current various versions of the document.

Outline of Solution

U.S. Pat. App. No. 2012/0136862 to Robin Glover, incorporated herein by reference describes systems for comparing word-processing documents. Implementation of the innovations in U.S. Pat. App. No. 2012/0136862 are based on the comparison process generating a machine readable summary of the full comparison document. In our case this comparison summary is in XML format and contains the entire structure and content of the redline document (tables, headers, footers, footnotes, fields, bookmarks, etc.) in the XML structure. This XML document includes information to mark various items as inserted, deleted or moved to reflect the results of the comparison of the two documents. Consider now a document with a number of versions, which are derived from each other—1 . . . n. If we know the location of some feature of the document in version A and we want to track it to its location in version B (assume A is an older version than b for now), we proceed as follows.

Figure 6:
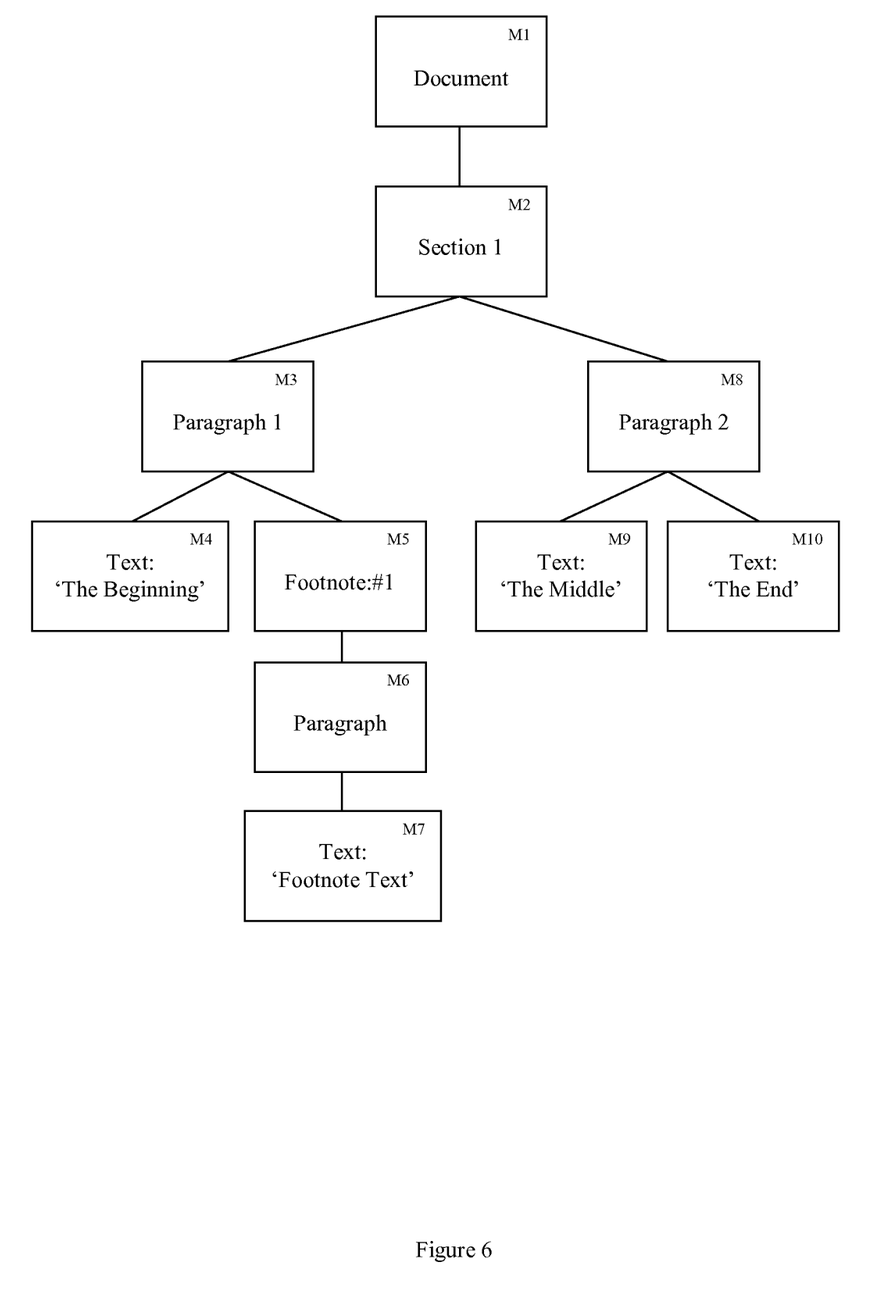
FIG. 6 shows an example hierarchy of second document version.
Figure 7:
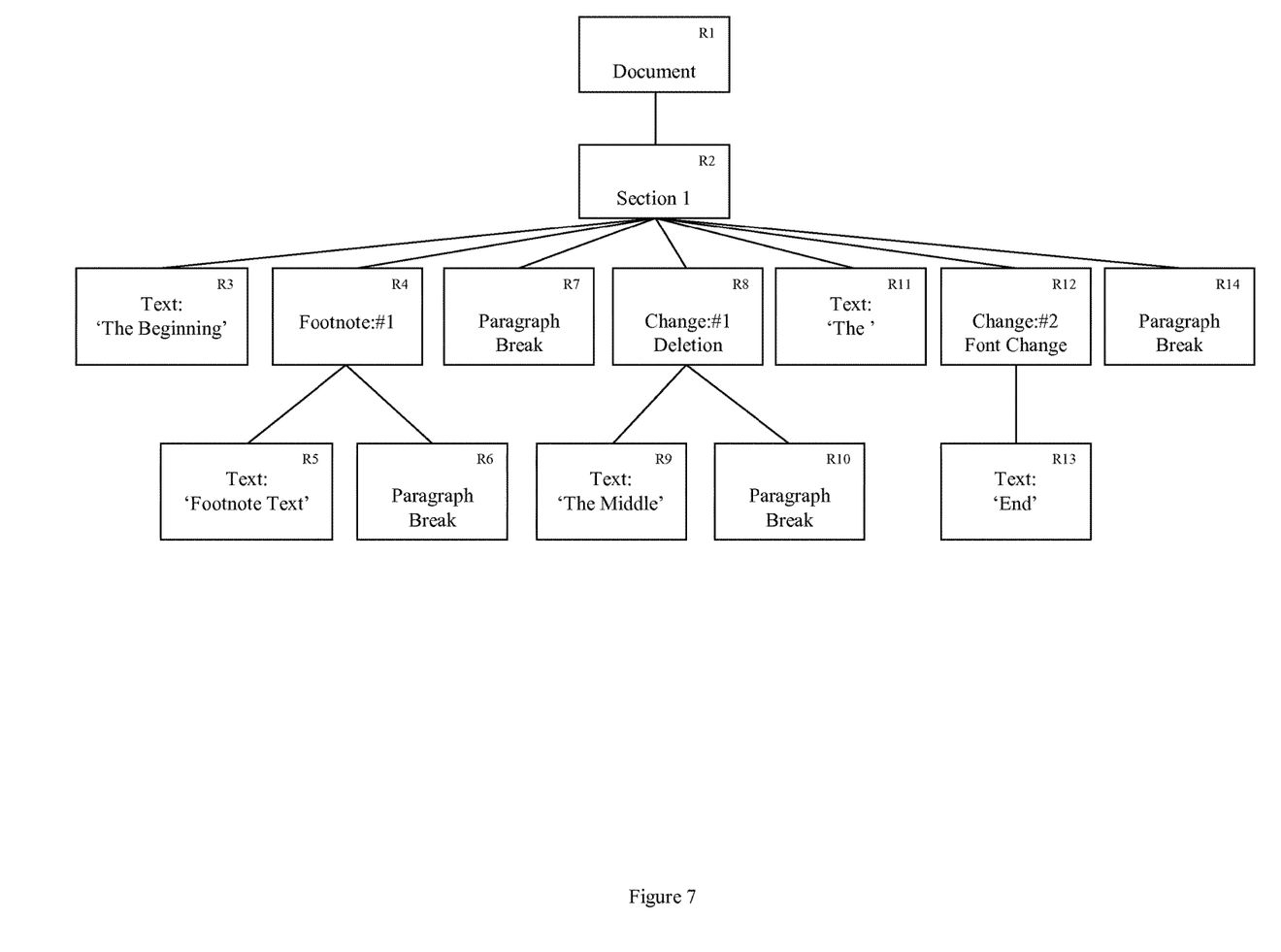
FIG. 7 shows an example hierarchy of comparison rendition.

Compare version A (the 'original' version) with version B (the 'modified' version) using a document comparison engine. The output of this comparison is to be a machine readable summary of the comparison (possibly in XML format as described above). Let's call this the redline or a rendition of the comparison. First we load the original and modified documents into corresponding hierarchical in-memory representations. See FIGS. 5 and 6. There are a number of products, both freely available and commercial which facilitate this by providing an object model to access document content. For example the OpenXML SDK from Microsoft™ provides such an object model for reading DOCX & DOCM documents. Similarly, the redline output is loaded into an in-memory object model hierarchical representation. See FIG. 7. Note that the in-memory representations are purely for convenience, and that the algorithms described could be made to work while reading the content they required at a particular point in time direct from the version files and machine readable redline document.

Now the technique for hierarchical mapping can be applied twice—firstly between the original document hierarchy and the redline hierarchy and secondly between the modified document hierarchy and the redline hierarchy. The rules for what content is ignorable, how content should be matched and what resynchronizations to apply need to be based on the details of how the document and redline are represented in their respective object models, but the following basic rules need to be included:

When mapping the redline to the original, all elements in the redline marked as inserted (or move destination) should be treated as ignorable.

When mapping the redline to the modified, all elements in the redline marked as deleted (or move source) should be treated as ignorable.

By ignoring all inserted content from the redline, the structure and content of the remaining, un-ignored, redline elements should essentially match the structure and content of the original document, allowing for a successful mapping between the original and the redline content. Similarly ignoring deleted content when mapping the modified allows for a successful mapping between the redline and the modified document.

As a result of the two mapping procedures completing, there now exist correspondences between nodes in the redline hierarchy and the appropriate matching nodes in the original and modified versions of the document. A position or piece of content from the original document can be tracked to the equivalent location in the modified document by first following the correspondence from the node (or nodes) that represent the item in the original document to the equivalent nodes in the redline. Then, it can be tracked from the node in the redline to the corresponding node in the modified version of the document. The correspondence between the redline and the modified can then be followed to identify the nodes in the modified document that correspond to the starting content or position in the original document. For example, if an object needs to be positioned in the modified document, its location in the original can be mapped to the modified and then the object inserted into the modified with the appropriate position data so that it appears when rendered in the correct place. In cases of comments or other content, the content is not necessarily inserted, rather, its displayed or included with reference to the correct location in the modified document so that the second document is not changed, but rather displayed with an overlay, or reference.

Where the aim is to track a block of content from one version of the document to another, the nodes marking the beginning and end of the block to be tracked should be traced through the correspondences to the redline and then the modified version independently, giving an equivalent range in the modified document. Some nodes in the redline document will have no corresponding node in the original or modified document—this will occur for nodes representing inserted or deleted text as detected by the comparison. For instance, when mapping the modified to the redline, deleted text in the redline is ignored, so that it will have no correspondence to an item in the modified. This behavior is undesirable—it means that if we try to track a block of text that is deleted or partially deleted from the original to the modified document we may not get a result for the position where the text was deleted from in the modified document. To avoid this problem, the mapping strategy is modified so that ignored nodes are mapped against the last node visited in the opposite data source. This means that a deleted block of text, when mapped from the original to the modified will end up as a single point in the modified document at the position where the deleted text was removed.

Although the previous discussion talks about tracking a location (or range) in the document from the original to the modified document via a comparison, once the comparison and the mappings are performed the same techniques can be used to track a location or range in the modified document to the original document. In this case, tracking a block of text which has been inserted from the modified document to the original document will end up with the result being the location in the original document where the text was inserted (just as tracking a deleted block from the original to the modified ends up at the point where the text was deleted in the modified document).

Dealing with Moves

Special handling must be added for the case where text is moved between the two documents. When tracking a location in the original document that is within moved text, the first stage of mapping will result in a position in the redline. This position will be within a 'move source' change. In order to translate to the correct location in the modified document, before performing the second mapping from the redline to the modified, the location in the redline must be updated to a position within the 'move destination' change that corresponds to the move source. The transfer of location between the two halves of the move within the redline is possible because a) All changes in the redline are assigned change numbers
b) Move changes in the redline are labelled with a 'partner change number'—the number of the change corresponding to the other half of the move
c) Moves are by definition identical at each end, so if a position that is (say) 5 characters after the beginning of the move source change needs to be transferred to a position in the move destination change, the exact position can be determined by character counting forward 5 characters from the start of the move destination change.

Handling multiple Versions

When there are multiple versions (more than two) of a document that need to have positions tracked between them, there are two approaches that can be followed.

1) Perform comparisons of each version where locations need to be tracked *from* against each version where locations need to be tracked *to*. If there are N versions in the tree, in theory this could lead to a maximum of N*(N−1)/2 comparisons, although in the more common use case where all locations need to be tracked to a single target version, a maximum of N−1 comparisons are needed. Locations need to be tracked through a single comparison to locate their position in the target version.

2) Perform comparisons between each version and its parent version. If there are N versions in the tree, this leads to a maximum of N−1 comparisons needed. Locations may need to be tracked through multiple comparisons to location their positions in the target version.

Figure 3:
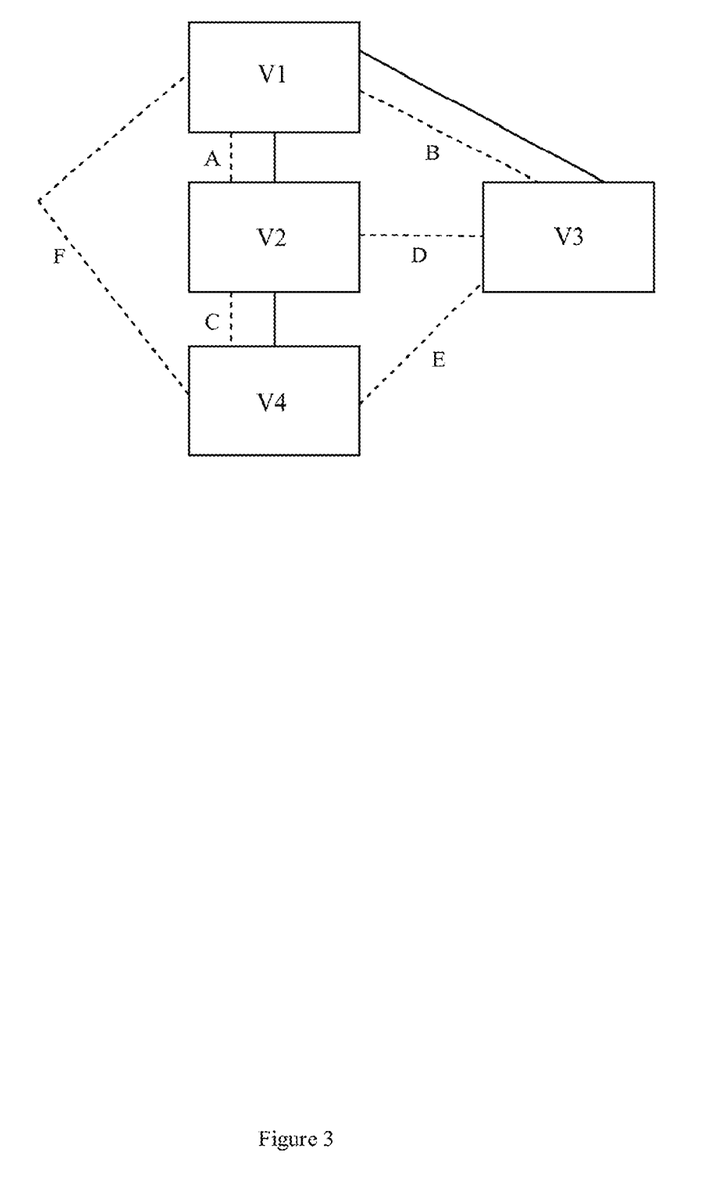
FIG. 3 shows an example parallel revisions relationships.

Referring now to FIG. 3:

Where V1 is the original version, V2 and V3 are derived from V1 and V4 is derived from V2. Possible comparisons are shown with dotted lines and labelled with the letters A through F. Supposing that the aim is to translate locations of items in versions V1 through V3 to the equivalent locations in the latest version, V4. Using approach 1) above would require that comparisons C, E and F be performed, allowing locations in V1 to be found in V4 via comparison F; locations in V2 via C and locations in V3 via E. Using approach 2) above would require comparisons A, B and C to be performed. Locations in V2 can be found in V4 via comparison C. Locations in V1 can be found in V4 by first calculating the equivalent location in V2 via comparison A, then using comparison C to calculate the positions in V4. Locations in V3 can have their equivalent locations found by using comparison B (in reverse, tracking locations from the modified to original), then comparisons A and C to finally obtain locations in V4. The choice of which approach to follow when dealing with multiple versions will depend on the details of the problem being solved, in some cases approach 1 will be preferable and in some cases approach 2. Computational costs may be lower with one approach than the other (depending on use case). Also accuracy may differ between the two approaches—in general comparisons provide a more detailed description of changes between two versions when the changes between the two are relatively small—this may mean that following approach 2 where the comparisons are between 2 adjacent versions in the tree and are presumably smaller may be the best option rather than following approach 1 where comparisons may be between versions that are distant from each other in the tree and have significant changes in their content.

Operating Environment:

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems. In some instances, especially where the mobile computing device is used to access web content through the network (e.g., when a 3G or an LTE service of the phone is used to connect to the network), the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), etc.

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. The servers may be virtual servers, each an instance of software operating as an independent server but housed on the same computer hardware. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Also, while processes or blocks are at times shown as being performed in series, these processes or blocks may instead be performed or implemented in parallel, or may be performed at different times.

What is claimed:

1. A method for comparing a first representation of a document created by reading the document through a first document display or editing program, and a second representation of the document, created by reading the document through a second document display or editing program, different than the first document display or editing program, comprising:

obtaining a first hierarchy comprised of a first plurality of nodes representing an organization of alpha-numeric text data comprising the first representation and a second hierarchy comprised of a second plurality of nodes representing an organization of alpha-numeric text data comprising the second representation;

advancing a first reference data object and a second reference data object, the first reference data object and the second reference data object corresponding to the respective first and second hierarchies and referencing a first node from the first hierarchy and a second node from the second hierarchy,. respectively, each node in the first and second plurality of nodes being comprised of a data content with a corresponding data type;

making a first determination whether a data type associated with a data content comprising the first node may be ignored based on a difference between data types or data contents associated with the first node and the second node, and, in dependence on the first determination, advancing the first reference data object to a next node in a first search sequence of the first hierarchy;

making a second determination whether the data type associated with the data content comprising the second node may be ignored based on the difference between the data types or the data contents associated with the first and second nodes, and, in dependence on the second determination, advancing the second reference data object to a next node in a second search sequence of the second hierarchy; and in a case where the first and second determinations do not advance either the first or second reference data objects, making a third determination whether any of the data contents corresponding to the first node match any of the data contents corresponding to the second node, and, in dependence on the third determination, storing in a data file at least one data representing the matching data contents.

2. The method of claim 1 further comprising:

in dependence on the third determination, advancing the first and second reference data objects to the next node in the respective first and second search sequences of the respective first and second hierarchies.

3. The method of claim 2, wherein the first and second search sequences are depth first search sequences.

4. The method of claim 2, wherein the first and second search sequences are breadth first search sequences.

5. The method of claim 1, further comprising:

in dependence on the third determination being that there is no matching content, applying at least one resynchronization process to create a match between a third node comprising the first hierarchy and a fourth node comprising the second hierarchy.

6. The method of claim 5, wherein the resynchronization process is to determine whether at least one element of the content corresponding to the third node is an automatic numbering code and in dependence thereon, render the numbering and compare the numbering result to the content corresponding to the fourth node.

7. The method of claim 5, wherein the resynchronization process is applied to a DOCX type document, and further comprising determining whether the reference data object for the first hierarchy is at the start of a field and the reference data object for the other hierarchy is at a 'field start instruction node' and, in dependence on the determination, moving the first reference data object to the end of the field and the second reference data object to after the 'field end node,' respectively.

8. The method of claim 5, wherein the resynchronization process is to determine correspondences between field objects comprising the content corresponding to the respective first and second nodes in the respective first and second hierarchies and allowing special characters comprising the content corresponding to one node to be matched to their corresponding field object corresponding to the other node.

9. The method of claim 5 wherein the resynchronization process is to test the match between a next predetermined number of characters associated with each corresponding first and second node on a character by character basis with varying offsets in order to determine an offset value with the best possible match and then adjust the position of the first and second reference data objects to refer to a third and fourth nodes using the determined offset value.

10. A computer system comprised of at least one central processing unit and one mass data storage device and computer memory, said computer memory comprised of data representing a series of instructions that when executed by the central processing unit causes the computer system to perform the method claimed by claim 1.

11. A non-transitory computer readable media comprised of data representing a series of instructions that when executed by a computer system, causes it to perform the method claimed by claim 1.

12. The method of claim 1 further comprising: tracking the location of a content move change in a content move source comprising the first hierarchy by updating the location of the second reference data object corresponding to the second hierarchy to a reference of position within a move change destination that corresponds to the location of the move source in the first hierarchy.

13. The method of claim 1, wherein the first and second representations are data files of two different document encoding types.

14. The method of claim 1, wherein at least one node in the second hierarchy is comprised of a location data that represents a desired position for a text corresponding to the location data to appear when the second representation is displayed.

15. A computer system comprised of a computer memory storing instructions for comparing a first representation of a document, created by reading the document through a first document display or editing program, and a second representation of the document, created by reading the document through a second document display or editing program, different than the first document display or editing program, and at least one processor configured to execute the instructions to perform operations comprising:

obtaining a first hierarchy comprised of a first plurality of nodes representing an organization of alpha-numeric text data comprising the first representation, and a second hierarchy comprised of a second plurality of nodes representing an organization of alpha-numeric text data comprising the second representation;

advancing a first reference data object and a second reference data object, each of the first reference data object and the second reference data object corresponding to the respective first and second hierarchies and referencing a first node from the first hierarchy and a second node from the second hierarchy respectively, each node in the first and second plurality of nodes being comprised of a data content with a corresponding data type;

making a first determination whether a data type associated with a data content comprising the first node may be ignored based on a difference between data types or data contents associated with the first node and the second node, and in dependence on the first determination, advancing the first reference data object to a next node in a first search sequence of the first hierarchy;

making a second determination whether the data type associated with the data content comprising the second node may be ignored based on the difference between data types or data contents associated with the first and second nodes, and, in dependence on the second determination, advancing the second reference data object to a next node in a second search sequence of the second hierarchy; and in a case where the first and second determinations do not advance either the first or second reference data objects, making a third determination whether any of the data contents corresponding to the first node match any of the data contents corresponding to the second node, and, in dependence on the third determination, storing in a data file at least one data representing the matching data contents.

16. The system of claim 15, wherein the operations further comprise:

advancing the first and second reference data objects to the next node in the respective first and second search sequences of the respective first and second hierarchies in dependence on the third determination.

17. The system of claim 16 wherein the first and second search sequences are depth first search sequences.

18. The system of claim 16, wherein the first and second search sequences are breadth first search sequences.

19. The system of claim 15, wherein the operations further comprise:

making a fourth determination whether at least one resynchronization process can create a match between a third node comprising the first hierarchy and a fourth node comprising the second hierarchy of any content corresponding to the respective first and second nodes in dependence on the third determination being that there is no matching content.

20. The system of claim 15, wherein the first and second representations are data files of two different document encoding types.

21. The system of claim 15, wherein at least one node in the second hierarchy is comprised of a location data that represents a desired position for a text corresponding to the location data to appear when the second representation is displayed.

* * * * *